United States Patent
Ordonez et al.

(10) Patent No.: US 7,637,450 B2
(45) Date of Patent: Dec. 29, 2009

(54) FLY-FISHING REEL

(76) Inventors: Ignacio Ordonez, Amenabar 2242-1D, Buenos Aires (AR) 1428; Hugo Luis Chiera, Estomba 2512-Depto 1, Buenos Aires (AR) 1430

( * ) Notice: Subject to any disclaimer, the term of this patent is extended or adjusted under 35 U.S.C. 154(b) by 0 days.

(21) Appl. No.: 12/134,931

(22) Filed: Jun. 6, 2008

(65) Prior Publication Data

US 2008/0302900 A1   Dec. 11, 2008

(30) Foreign Application Priority Data

Jun. 11, 2007   (AR) ............................... P070102534

(51) Int. Cl.
*A01K 89/01* (2006.01)
(52) U.S. Cl. .................... 242/317; 242/292; 242/301
(58) Field of Classification Search ............... 242/317, 242/290–292, 301
See application file for complete search history.

(56) References Cited

U.S. PATENT DOCUMENTS

| | | | |
|---|---|---|---|
| 730,457 A | 6/1903 | Howe | |
| 1,379,692 A | 5/1921 | Pflueger | |
| 1,544,671 A | 7/1925 | Maury | |
| 2,333,632 A | 11/1943 | Benson | |
| 3,467,336 A | 9/1969 | Appleton | |
| 3,526,370 A | 9/1970 | Arsenault | |
| D226,311 S | 2/1973 | Lemery | |
| 3,986,679 A | 10/1976 | McMickel | |
| 4,352,474 A | 10/1982 | Kovalovsky | |
| 4,703,902 A | 11/1987 | Prouza et al. | |
| 5,407,144 A * | 4/1995 | Ryall | 242/295 |
| 5,417,377 A * | 5/1995 | Park | 242/292 |
| 5,425,510 A * | 6/1995 | Pinvidic | 242/256 |
| 5,482,221 A | 1/1996 | Peterson et al. | |
| D371,823 S | 7/1996 | Charlton | |
| 5,615,840 A * | 4/1997 | Bushnell et al. | 242/301 |
| 5,752,667 A | 5/1998 | Merrill et al. | |
| 5,915,639 A | 6/1999 | Farris | |
| 6,010,087 A | 1/2000 | Merrill et al. | |
| 6,021,970 A | 2/2000 | Fritts et al. | |
| 6,053,445 A | 4/2000 | Farris | |
| 6,065,699 A | 5/2000 | Sacconi | |
| 6,076,640 A | 6/2000 | Carlson | |
| 6,116,531 A * | 9/2000 | Young | 242/301 |
| 6,155,508 A | 12/2000 | LePage | |
| 6,193,182 B1 * | 2/2001 | Capra | 242/292 |
| D443,017 S | 5/2001 | Alden | |
| 6,267,312 B1 | 7/2001 | Farris et al. | |
| 6,286,772 B1 | 9/2001 | Koelewyn | |
| 6,402,073 B1 | 6/2002 | Datcuk, Jr. | |

(Continued)

*Primary Examiner*—Emmanuel M Marcelo
(74) *Attorney, Agent, or Firm*—Volpe and Koenig, P.C.

(57) ABSTRACT

A fly-fishing reel is provided for rewinding a fishing line on a spool, whose movement is limited, in at least one sense, by a braking mechanism. The fly-fishing reel includes a self-supporting structure and a spool. The self-supporting structure includes a central axis which bears on it the braking mechanism, which includes a first lateral containing ring, a brake ring concentrically arranged within an adjustment track or ring, and a second lateral containing ring. The brake ring is a split ring defining a guide slot along which a braking adjustment member is displaced. The braking adjustment member expands or contracts the brake ring. A blocking member is also concentrically mounted on the adjustment track or ring, which is in turn arranged without a relative sliding among them within the spool.

6 Claims, 4 Drawing Sheets

U.S. PATENT DOCUMENTS

| | | |
|---|---|---|
| 6,513,743 B1 | 2/2003 | Perkins, Jr. et al. |
| 6,550,709 B2 | 4/2003 | Vashro |
| 6,732,965 B2 | 5/2004 | Bascue, Jr. |
| 6,964,389 B2 * | 11/2005 | Hill et al. ................ 242/301 |
| 7,168,647 B1 | 1/2007 | Kang |

* cited by examiner

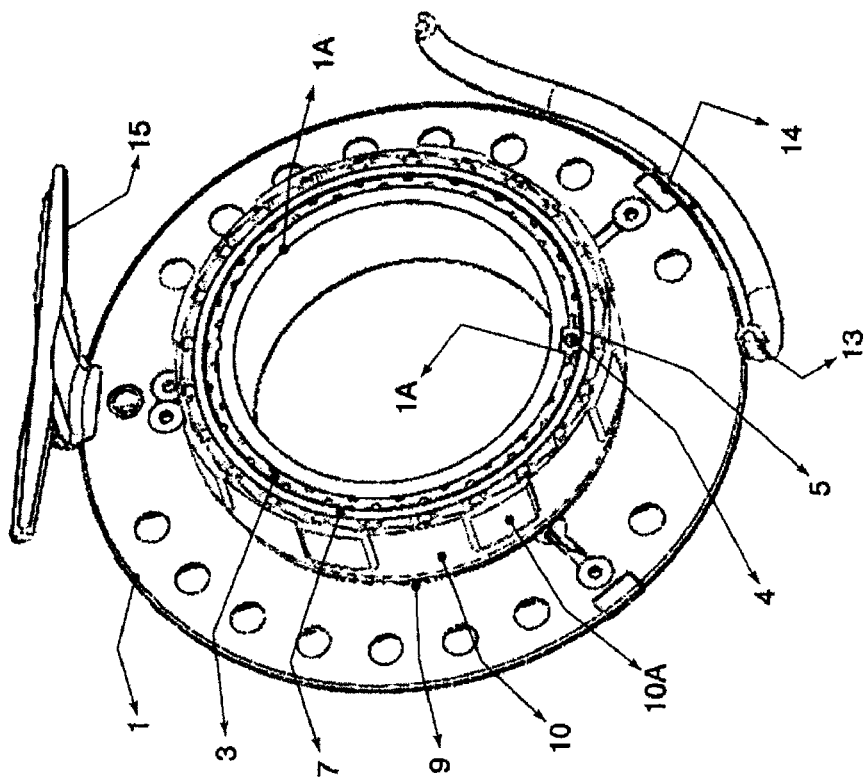
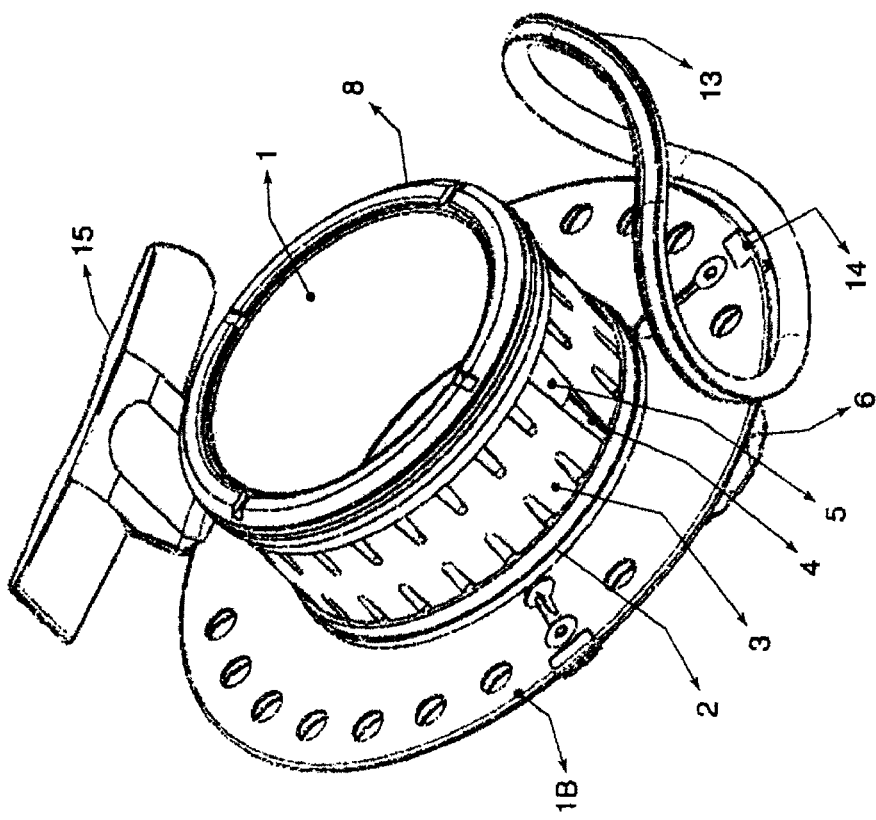

ately, the present invention also relates to a fly-

FLY-FISHING REEL

FIELD OF INVENTION

The present invention relates to a fly-fishing reel of the kind that allows retrieval or rewinding of a line in an orderly manner on a spool designed to such end, movement thereof being limited as regards one or both rotation senses by a brake mechanism which functions by friction between cylindrical surfaces.

BACKGROUND

A wide range of fly-fishing reels are known which exhibit different braking mechanisms for the line-containing spool, which mechanisms allow adjustment of the resistance said spool is to overcome in order to rotate in a certain sense and thence the strength a fish will exert in order to withdraw said line from the reel.

In many cases, such braking mechanisms act compressing or flattening, by a rotary knob, overlapping discs of different materials, thus creating a static and dynamic resistance to an element performing as a brake or resistance generating element, and which transfers said resistance through several gear or transmission systems to a spool or spool-support which rotates on an axis. In all cases the spool or spool-support axis is perpendicular to the faces of the brake discs and in some cases it is displaced from the axis of said brake discs.

The main problem posted by these fly-fishing reels is that braking mechanisms have a limited adjustment capacity, due to the reduced dimensions of the friction surfaces of said brake discs, which are within the reel, and also, due to the limited force that may be exerted from an external knob.

In other fly-fishing reels, the brake discs and rotary knobs have been replaced by an oil container which modifies density thereof as a function of the rotation speed of the spool or spool support by the action of mixing blades located inside said container and connected to the rotation axis of said spool, thus achieving a self-adjustable braking. The main drawback thereof is that user is not able to adjust at will the braking resistance because, as already discussed, it is automatically adjusted. Another problem is that the braking maximum force is low.

An additional drawback is that on known fly-fishing reels, spools or spool supports are always mounted on an axis which is attached by one of its ends to the reel structure. This structure is in turn firmly coupled to the rod by an adequate coupler. When a fish pulls the line, tangential forces are produced which actuate on the spool or spool support axis exerting a lever action on the attachment point thereof to the reel structure, which fact may lead sometimes to the breakage or disarrangement thereof.

SUMMARY

The invention relates to a fly-fishing reel for rewinding a fishing line on a spool, whose movement is limited, in at least one sense, by a braking mechanism. The fly-fishing reel includes a self-supporting structure and a spool. The self-supporting structure includes a central axis which bears on it the braking mechanism, which includes a first lateral containing ring, a brake ring concentrically arranged within an adjustment track or ring, and a second lateral containing ring. The brake ring is a split ring defining a guide slot along which a braking adjustment member is displaced. The braking adjustment member expands or contracts the brake ring. A blocking member is also concentrically mounted on the adjustment track or ring, which is in turn arranged without a relative sliding among them within the spool.

BRIEF DESCRIPTION OF THE DRAWINGS

The invention shall be better understood when reference is made to the accompanying drawings which represent a non-limiting preferred embodiment thereof.

In the accompanying drawings:

FIG. 3 is a left-hand bottom perspective view of the reel according to the present invention in a partially assembled condition.

FIG. 4 represents a perspective longitudinal section of the reel according to the present invention with the brake mechanism fully assembled, wherein the relationship among the components of said brake mechanism can be seen.

DETAILED DESCRIPTION OF THE PREFERRED EMBODIMENTS

Introduction to the Embodiments

Figure 2:
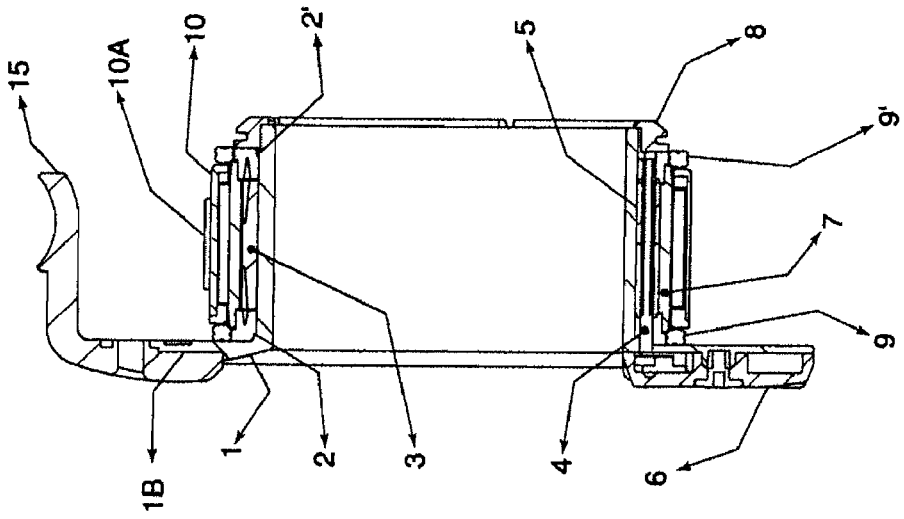
FIG. 2 is a schematic front cross sectional view of the reel according to the present invention wherein all of the brake mechanism elements can be viewed, mounted one above the other and all of them in turn on a self-supporting structure.
Figure 1:
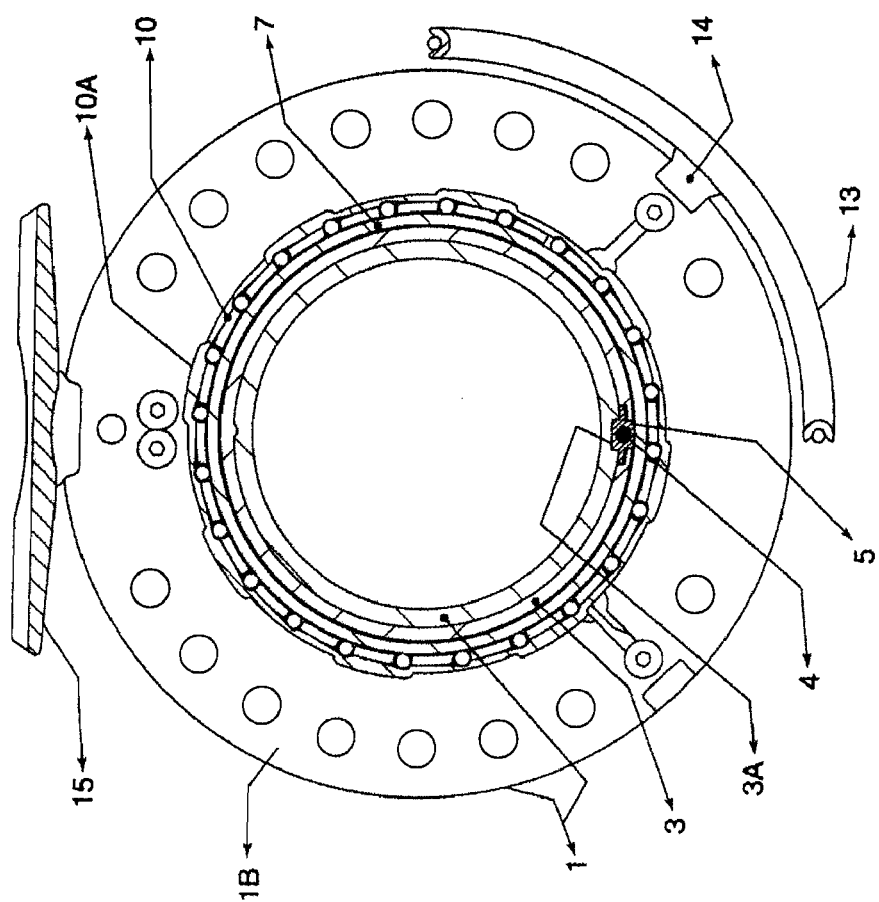
FIG. 1 is a schematic view of a longitudinal cut of the reel which is the object of the invention, wherein it can be appreciated the concentric arrangement of the braking mechanism components.
Figure 5:
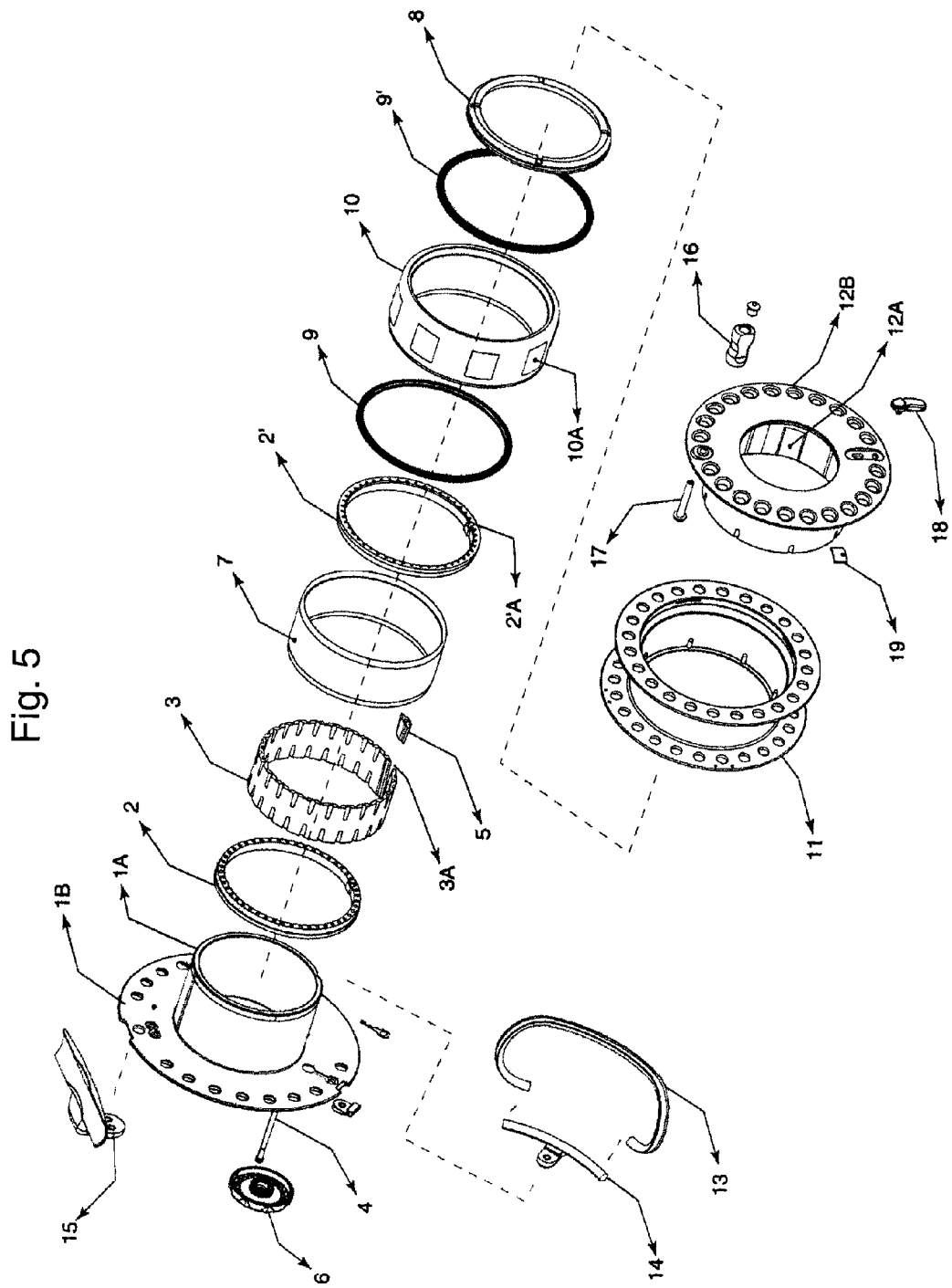
FIG. 5 is an exploded basic view of the elements conforming the reel according to the present invention.
Figure 6:
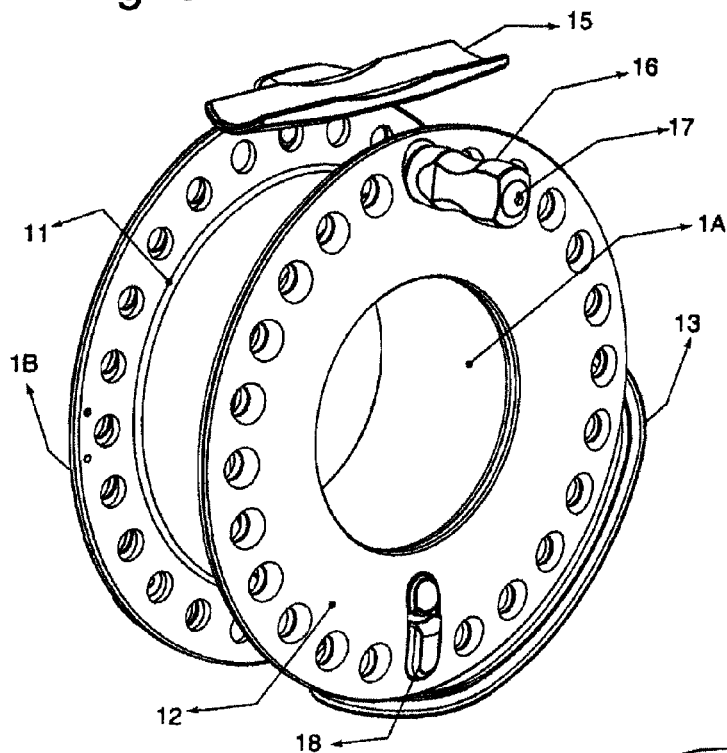
FIG. 6 represents a left-hand elevational perspective view of the fly-fishing reel according to the present invention.
Figure 7:
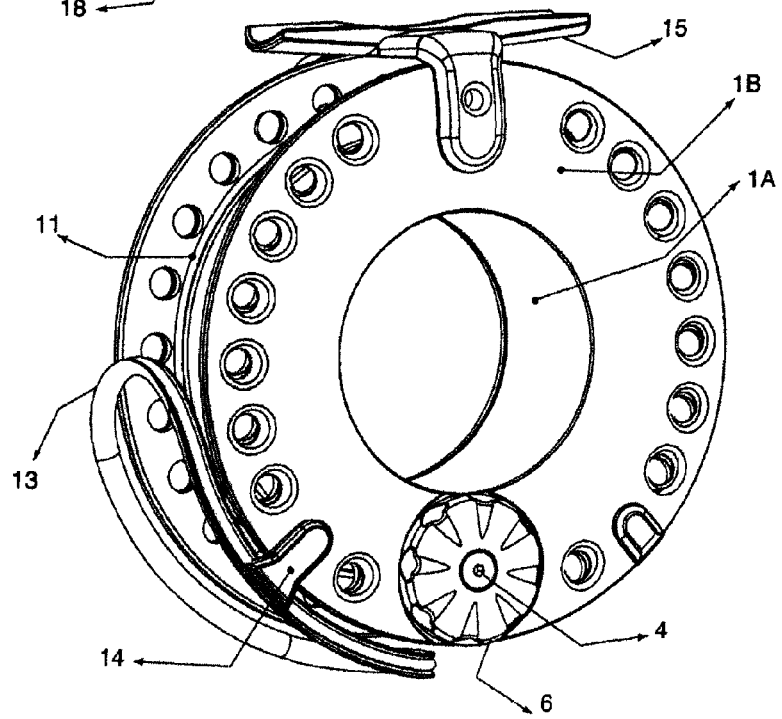
FIG. 7 is a perspective left-hand elevational back view of the fully assembled reel according to the present invention.

The present invention is directed to a reel with a self-supporting structure on which a brake mechanism and spool device are mounted, said spool device being mounted on said brake mechanism, thus allowing a substantial increase on the braking friction surface and the direct action of said brake against the element to be stopped and not through accessory elements.

A structure which is more resistant to tangential forces is also attained, as said forces do not actuate on a single point but along a plurality of points which form a cylinder.

Accordingly, the present invention also relates to a fly-fishing reel which allows retrieval or rewinding of a line in an orderly manner on a spool designed to such end, and which movement is constrained in at least one rotating sense by a braking mechanism, said reel being conformed at least by a self-supporting structure and by a spool device which houses said line, said self-supporting structure comprising a central axis on which the above mentioned braking mechanism is mounted, said braking mechanism being formed by a first and second edge containing rings, and a brake ring assembled within an adjustment track, said brake ring exhibiting a cut which conforms a guide slot through which braking adjustment members are displaced causing the expansion or contraction of said brake ring against said adjustment track. A blocking member is concentrically mounted on said adjustment track, which device rotates in one sense only, it being assembled without sliding within the spool.

Said braking adjustment member is controlled by the action of an adjustment knob which is mounted on the self-supporting structure.

DETAILED DESCRIPTION

The present invention relates to a fly-fishing reel comprising a self-supporting structure 1 on which the mechanism conforming said reel, including the brake mechanism, is mounted.

Said braking mechanism consists of several pieces which are concentrically mounted on the self-supporting structure 1, which is formed by a central axis 1A that supports on one of its edges a circular crown which in turn forms the back 1B of what is known as the reel housing. Said central axis 1A bears a first lateral containing ring 2 followed by a brake ring 3, which is a ring which shows an opening such that its sectioned part is trapezoidal in shape. Said sectioned part forms a guide slot 3A. Opening and angle formed by said guide slot wall 3A may vary without affecting the object of the present invention. The larger opening of said guide slot 3A is preferably, but not necessarily, at the edge of the brake ring 3 which is farthest from back 1B of the self-supporting structure 1.

Said guide slot 3A incorporates a braking adjustment member, which in this preferred embodiment of the invention comprises a braking adjustment carriage 5, slidably mounted along said guide slot 3A, and joined by an adjustment screw 4, such that when said adjustment screw 4 is turned by an adjustment knob 6, the braking adjustment carriage 5 slides inwards or outwards within said guide slot 3A.

In this embodiment, braking adjustment carriage 5 has a generic trapezoidal or wedge shape, and the angle formed by its two lateral faces is the same as that formed by lateral faces of guide slot 3A.

Said braking carriage 5, when sliding inwards or outwards within said guide slot 3A, causes the diametric expansion or contraction of the brake ring 3 in a greater or lesser way according to the advance or reverse thereof. This is attained by turning adjustment knob 6 in either sense. This adjustment knob 6 is linked to said adjustment screw 4 by two gears, (not shown) which are housed within the back 1B of self-supporting structure 1, and thus an adequate multiplication for the reel correct performance is attained. Said linking of adjustment knob 6 to adjustment screw 4 may be carried out in any known manner.

A ring or adjustment track 7 is concentrically placed on the brake ring 3, followed by a second lateral containing ring 2' in such a way that the edges of said ring or adjustment track 7 rest on the two lateral containing rings 2 and 2', over the braking adjustment carriage 5 and the brake ring 3.

When said braking adjustment carriage 5 slides into guide slot 3A, brake ring 3 expands and is compressed against the external ring or adjustment track 7, thus increasing the friction force between said rings. It is clear that upon sliding of said braking adjustment carriage 5 the friction force exerted by brake ring 3 against the internal face of ring or adjustment track 7 may be varied.

The second lateral containing ring 2' exhibits retainer 2A' when in acting position of the free end of said adjustment screw 4. A closing ring 8 is successively mounted, said ring performing as a stop in order that those pieces conforming brake mechanism 2, 2', 3, 4, 5 and 7 do not displace outwards from central axis 1A of the self-supporting structure 1.

A first retaining ring 9 is concentrically mounted on the adjustment track or ring 7, said retaining ring function is to isolate the brake mechanism from dirt, this being followed by a blocking member 10 which freely rotates in one sense, and in the other sense it blocks the advance thereof. In this embodiment, said blocking member 10 consists of a bearing which comprises known anti-backup rollers, such as a plurality of cylindrical pins arranged on grooves transversally located as regards the rotation sense which block movement in one sense and release same in the opposite sense. These anti-backup rollers are not shown. It is clear that said blocking member 10 may be configured according to any known manner in order to inhibit displacement in one sense.

Following said blocking member 10 a second retaining ring 9' is mounted, which ring has the same function as the first retaining ring 9.

Said blocking member 10 exhibits in its external face external lock 10A which is coupled with internal lock 12A arranged on the internal face of the spool, which in this embodiment consists of a spool support 12. It is clear that they can also be arranged on the internal face of a spooler or spool with rewinding knob.

Said spool support 12 is concentrically mounted on blocking member 10 in such a way that the external locking member 10A are wedged with internal lock 12A of the spool support 12, thus inhibiting the relative displacement between said spool support 12 and said blocking member 10.

Said spool support 12 conventionally bears on its lateral face, which corresponds to reel front 12B, a rewinding knob 16, which upon rotating on a rewinding knob axis 17 transmits rotation to spool support 12 and blocking member 10. A spool 11 which bears the fishing line is concentrically and slidelessly mounted on said spool support 12.

Said fishing line (not shown) exits from spool 11 through an exit guide 13 which is solidly associated to back 1B of reel housing by an exit guide support 14.

According to the above, when the line is wound by the rewinding knob 17, spool support 12 and spool 11 rotate and in turn drag blocking member 10, which freely rotates on the adjustment track or ring 7. Consequently, rewinding of the line is accomplished without any effort from the part of user.

On the contrary, when the line is pulled outwards, by the user or by a fish, spool 11 and spool support 12 will drag said blocking member 10, which will be locked on the external adjustment track or ring 7 dragging same by its rotation, this being accomplished according to the pressure exerted on said adjustment track or ring 7 by brake ring 3, said pressure being regulated by the action of braking adjustment carriage 5.

Said spool support 12 is associated in a known manner to said closing ring 8 by a closing latch 19 which is engaged therein and may be released by a locking knob 18 which is mounted on the external face of spool 12.

Said fly-fishing reel can be used by right- or left-handed individuals, as the free rotating sense of spool 11 is changed by inverting blocking member 10. The reel may be thence assembled on the rod with the rewinding knob 17 on either side thereof.

Materials used for the fly-fishing reel construction according to the invention are conventional ones, such as injection molded, rolled or mechanized aluminum, stainless steel, nylon, elastomers and eventually cork, Delrin, brass, etc.

What is claimed is:

1. Fly-fishing reel for rewinding a fishing line on a spool, whose movement is limited, in at least one sense, by a braking mechanism, the fly-fishing reel comprising a self-supporting structure and a spool, the self-supporting structure comprises a central axis which bears on it the braking mechanism, the braking mechanism comprises a first lateral containing ring, a brake ring concentrically arranged within an adjustment track or ring, and a second lateral containing ring, the brake ring is a split ring defining a guide slot along which a braking adjustment member is displaced which expands or contracts the brake ring; a blocking member is also concentrically mounted on the adjustment track or ring, which is in turn arranged within the spool, without a relative sliding between the blocking member and the spool.

2. The fly-fishing reel according to claim 1, wherein the guide slot is of trapezoidal or wedge shape, and said braking adjustment member comprises a braking adjustment carriage having one of a trapezoidal or wedge shape, and an angle formed by lateral faces defining the trapezoidal or wedge shape of the braking adjustment carriage is equal to an angle formed by lateral faces defining the trapezoidal or wedge shape of the guide slot edges.

3. The fly-fishing reel according to claim 2, wherein the braking adjustment carriage slides on an adjustment screw which is connected to an adjustment knob which is mounted on the self-supporting structure.

4. The fly-fishing reel according to claim 3, wherein said spool comprises a spool support on which the spool is concentrically and slidelessly mounted.

5. The fly-fishing reel according to claim 2, wherein said spool comprises a spool support on which the spool is concentrically and slidelessly mounted.

6. The fly-fishing reel according to claim 1, wherein said spool comprises a spool support on which the spool is concentrically and slidelessly mounted.

* * * * *